United States Patent
Putterman et al.

(10) Patent No.: US 7,904,923 B2
(45) Date of Patent: Mar. 8, 2011

(54) APPLICATIONS REGISTRY FOR A TELEVISION ENVIRONMENT

(75) Inventors: Daniel Putterman, San Francisco, CA (US); Brad Dietrich, San Francisco, CA (US); Gregory Peters, Los Gatos, CA (US); Richard Bullwinkle, Palo Alto, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 624 days.

(21) Appl. No.: 11/318,966

(22) Filed: Dec. 27, 2005

(65) Prior Publication Data

US 2007/0214481 A1  Sep. 13, 2007

Related U.S. Application Data

(60) Provisional application No. 60/641,878, filed on Jan. 5, 2005.

(51) Int. Cl.
*G06F 3/00* (2006.01)
(52) U.S. Cl. .......... 725/43; 725/40; 725/50; 725/60; 725/61; 725/152; 717/168; 717/178
(58) Field of Classification Search .......... 725/39–51, 725/132, 140, 152, 61, 60; 717/168–178
See application file for complete search history.

(56) References Cited

U.S. PATENT DOCUMENTS

| | | | | | |
|---|---|---|---|---|---|
| 5,768,539 | A | * | 6/1998 | Metz et al. | 709/249 |
| 6,133,909 | A | * | 10/2000 | Schein et al. | 715/721 |
| 6,167,568 | A | * | 12/2000 | Gandel et al. | 717/176 |
| 6,771,317 | B2 | * | 8/2004 | Ellis et al. | 348/569 |
| 2002/0124243 | A1 | * | 9/2002 | Broeksteeg et al. | 717/168 |
| 2003/0101232 | A1 | * | 5/2003 | Ullman et al. | 709/217 |
| 2003/0226141 | A1 | * | 12/2003 | Krasnow et al. | 725/9 |
| 2004/0083471 | A1 | * | 4/2004 | Nam et al. | 717/168 |
| 2005/0273820 | A1 | * | 12/2005 | Elberbaum | 725/60 |

* cited by examiner

*Primary Examiner* — Nick Corsaro
*Assistant Examiner* — Quan M Hua
(74) *Attorney, Agent, or Firm* — Ropes & Gray LLP

(57) ABSTRACT

An applications registry provides a repository of television-based applications. The registry stores information about television-based applications registered, and allows users to view information regarding the registered television-based applications through one or more portals. The information includes a general description of the television-based applications, a description of an entitlement model for the television-based applications, and downloading information to permit a user to download the application to the home media system. The user accesses the registry, to view information about the television-based application, through a home media system. The home media system, which includes a television, accesses the portal over a network, such as the Internet.

16 Claims, 8 Drawing Sheets

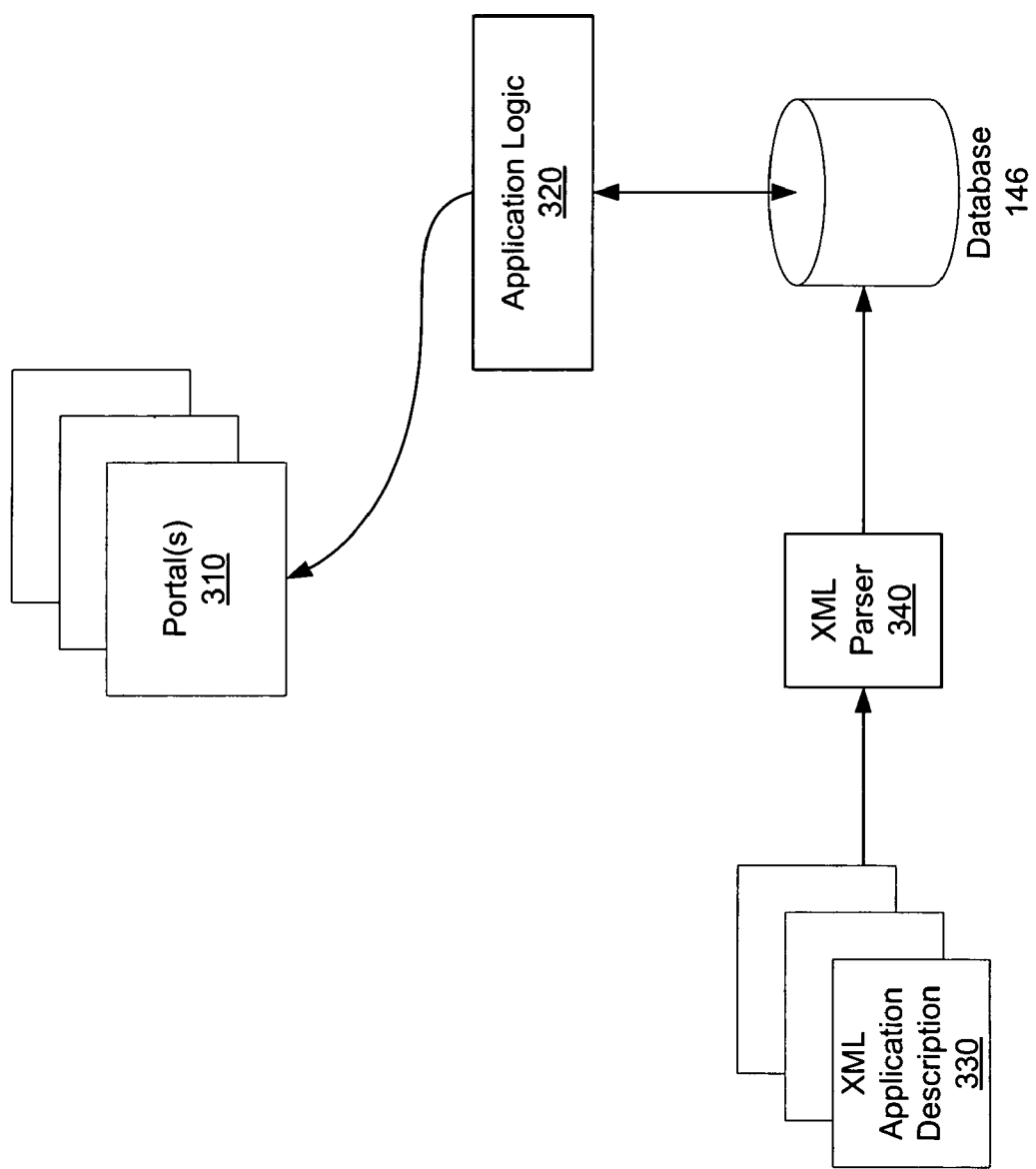

| NAME | DESCRIPTION | ICONS | | CATEGORIES | | | | | KEYWORDS | | | RATINGS | AUTHOR | ENTITLEMENT MODEL | PAYMENT |
|---|---|---|---|---|---|---|---|---|---|---|---|---|---|---|---|
| | | Browser | Applications | 1 | 2 | 3 | 4 | n | Word1 | Word2 | Wordn | | | | |
| Skydiving Channel | Watch video of parachuted acrobats perform in free fall |  | | ✓ | ✓ | | | ✓ | Skydiving | Parachute | ● | ★★★★☆ | J. Smith | Free For Educational Use | None required. |
| Pong Table Tennis | Game represents players as white slabs, each controllable by a mouse, which deflects a bouncing ball. Avoid missing ball for high score. | | 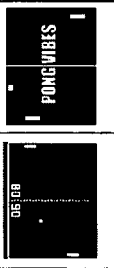 | ✓ | | ✓ | ✓ | | Pong | Game | ● | ★☆☆☆☆ | J. Smith | Voxel Public License | American Express, MasterCard, PayPal |
| Surfing Channel | Watch video of surfers riding the crest of waves |  | | | | | | ✓ | Surfing | Waves | ● | ★★☆☆☆ | R. Smith | Shareware | PayPal |
| Painting Program | Artistic software permits applying electronic paints to computer canvas | |  | ✓ | ✓ | ✓ | ✓ | | Painting | Artist | ● | ★★★☆☆ | A. Jones | Open Content License | None required. |
| Big Eraser | Security software protects against Data-mining, aggressive advertising, Parasites, Scumware, Malware, Browser hijackers, and tracking components. | |  | ✓ | | | | ✓ | Security | Spyware | ● | ★☆☆☆☆ | J. Smith | Proprietary License with Free Trial | MasterCard, PayPal |

FIG 4

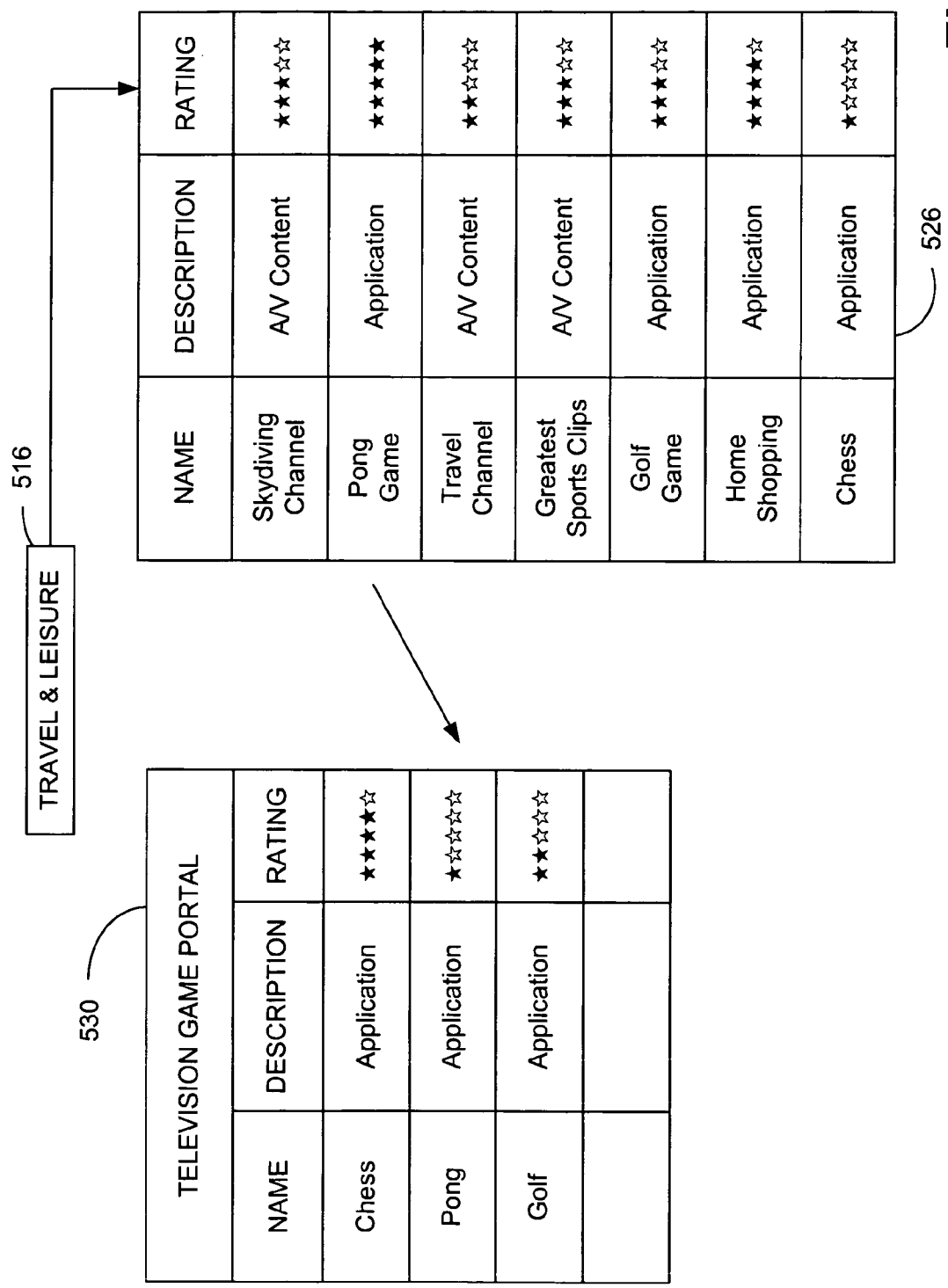

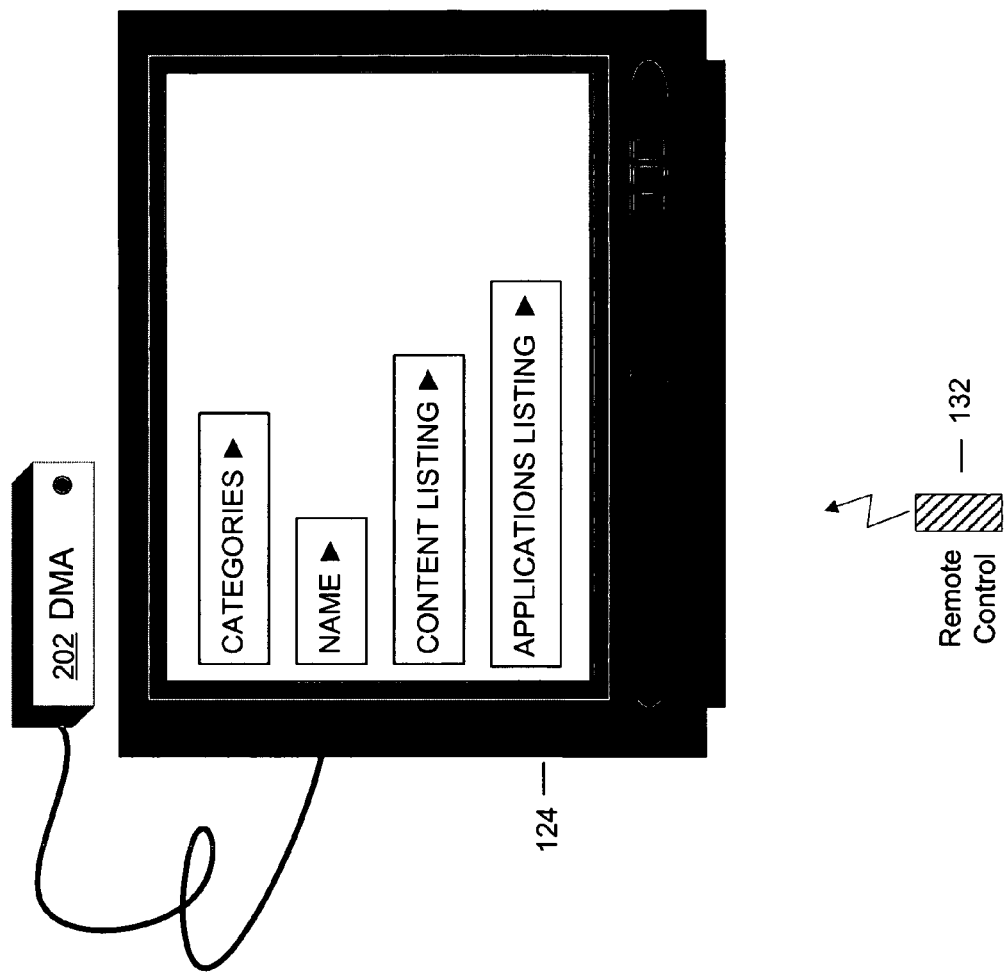

APPLICATIONS REGISTRY FOR A TELEVISION ENVIRONMENT

CROSS REFERENCE TO RELATED APPLICATIONS

This application claims the benefit of U.S. Provisional Patent Application entitled "An Applications Registry For A Television Environment", having Ser. No. 60/641,878, filed on Jan. 5, 2005.

BACKGROUND OF THE INVENTION

1. Field of the Invention

The present invention is directed toward the field of application software, and more particularly toward a registry for searching, browsing, and provisioning applications and content for a television based platform.

2. Art Background

Application programs run on computers to provide functionality for the computer. Today, there are a large number of application programs that allow computers to perform a wide range of tasks. After purchasing a computer, a typical computer user purchases application programs to provide specific functionality sought by the user. Traditionally, a computer user would locate application programs from a retail store. For example, a computer user may browse the retail store to locate titles of interest. The retail store may organize the application programs into categories, such as "games", "computer maintenance", "publishing", etc.

The Internet provides an on-line market place for the sale of all types of goods, including application programs. Currently, web sites exist to sell application programs. Some web sites provide features to enhance the user's shopping experience. However, these web sites are limited to application programs that run on the computer. In addition, these web sites require computer devices for access.

The present invention provides a registry to access, from a television or computer, application programs suitable for implementation in a television environment.

BRIEF DESCRIPTION OF THE DRAWINGS

FIG. 3 is a block diagram illustrating one embodiment for the registry system.

FIG. 4 illustrates example information for a television-based applications/content registry.

FIG. 5 illustrates an example search displayed at a third party portal.

FIG. 6 illustrates an example screen display for a television-based user interface for a registry browser.

SUMMARY OF THE INVENTION

Figure 1:
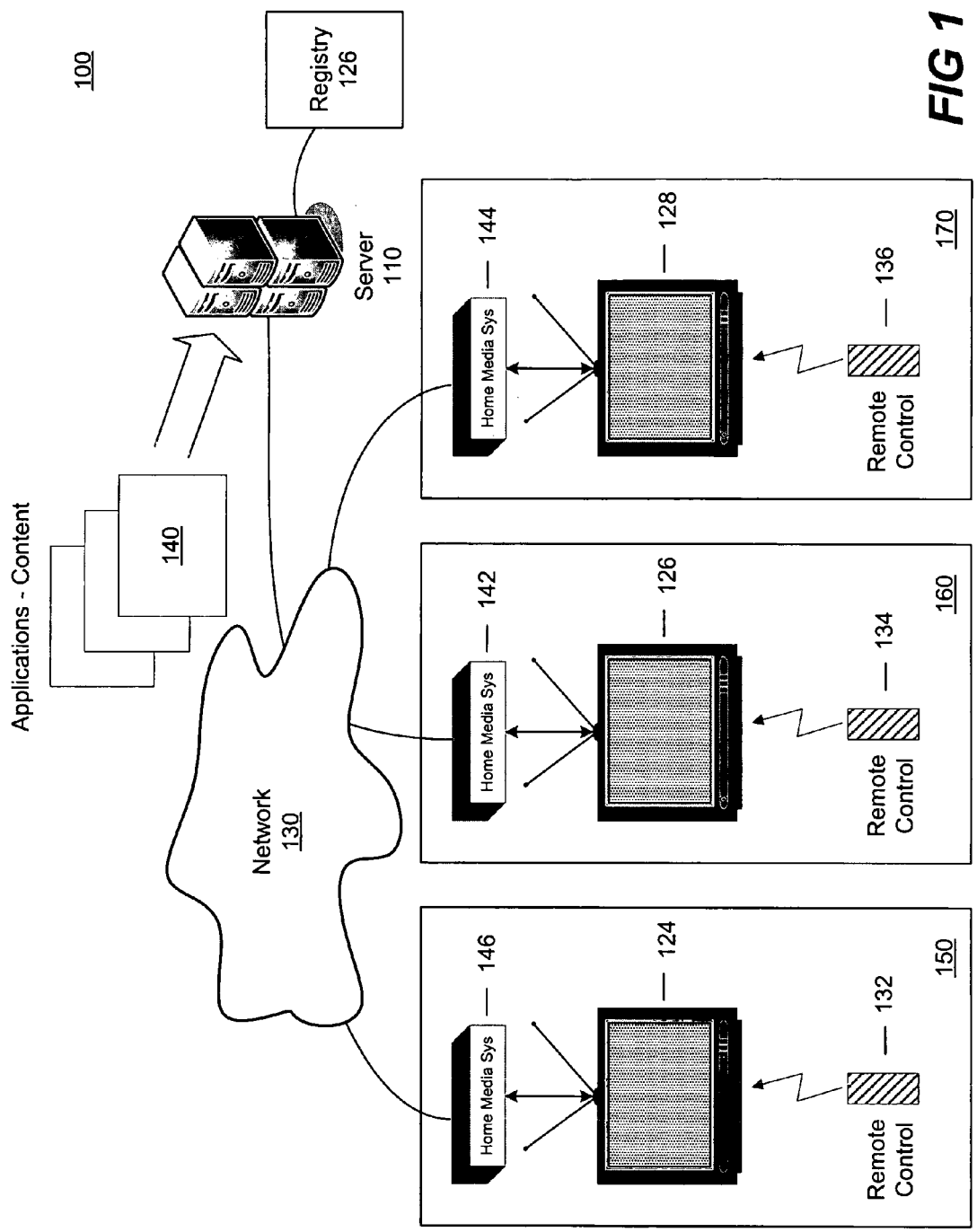
FIG. 1 illustrates one embodiment of a registry system.

An applications registry provides a repository of television-based applications. In general, a television-based application comprises an application program suitable for operation on a television (e.g., the application displays information and receives input from a television). The registry stores information about one or more television-based applications registered. In one embodiment, one or more servers host at least one portal. The portal allows users to view information regarding the registered television-based applications. In one embodiment, the information comprises a general description of the television-based applications, a description of an entitlement model for the television-based applications, and downloading information to permit a user to download applications to the home media system. In one embodiment, a user accesses the registry, to view information about the television-based applications, through a home media system. The home media system, which includes a television, accesses the portal over a network, such as the Internet.

The registry provides a means for a user to search for television-based applications. For example, a user may enter one or more keywords to search for television-based applications. In response, the registry lists application applicable to the keywords. The search results may be customized based on one or more criteria. The registry also provides a means for a user to browse the television-based applications. Furthermore, the registry also provides a means for a user to purchase or provision one or more television-based applications.

In one embodiment, the registry may comprise a plurality of portals of the television-based applications. Each portal may be customized to provide either different views of the television-based applications or different television-based applications. The customized portals may be implemented for different customers. For example, a customer may desire to offer, on its portal, only those television-based applications offered by itself and its partners.

The registry includes a user interface to allow a user, through the home media system, to view, search, browse and provision television-based applications. In one embodiment, the user interface is implemented on a television. For the television based user interface, the display and input controls are suitable for a television (e.g., the user receives a "10 foot" user interface experience). In another embodiment, the user interface is implemented on a computer, and the display and input controls are suitable for a computer (e.g., the user receives a "2 foot" user interface experience).

DETAILED DESCRIPTION

An open registry of applications programs and media content for television provides a platform to deliver applications and content to users. In general, the registry system provides a mechanism for application and content providers to submit applications and content. In turn, the applications/content are listed on the registry. The registry provides a mechanism for users to search, browse, and provision or purchase applications/content listed on the registry. The platform for the registry is based on an open standard so as to allow any third party application provider or any third party content provider to register their application or content. In one embodiment, the platform is based on a set of core standards, and utilizes an open application program interface ("API"). In one embodiment, the host of the registry system provides a minimum level of editorial review to ensure that the applications/content are secure and non-offensive. The television-based platform of applications/content is open in a manner similar to Web Sites on the Internet.

FIG. 1 illustrates one embodiment of a registry system. For the embodiment of FIG. 1, the registry of application programs and content is implemented using one or more servers 110. For example, a web server may be used to implement a portal for the registry, and an applications server may be used to implement business rules and logic. Servers 110 are coupled to network 130. Network 130 may comprise one or more types of communication networks, such as a public packet based networks (e.g., the Internet) or a private network. One or more households (150, 160 and 170) are coupled to network 130 to permit communication with servers 110. Each household may connect to network 130 through a high-bandwidth connection (e.g., cable, DSL, satellite, etc.).

As shown in FIG. 1, each household (150, 160 and 170) includes at least one television (124, 126 and 128). The televisions are controlled by remote controls (132, 134 and 136). For this embodiment, televisions (124, 126 and 128) are coupled to, and part of, home media systems (146, 142 and 144). As described more fully below, home media systems (146, 142 and 144) provide a mechanism to run applications that implement a user interface on televisions (124, 126 and 128). Application and content providers submit applications/content for listing on the registry. For registry system 100 of FIG. 1, applications/content 140 are submitted to server 110.

In general, the registry consists of a listing of applications/content for a television-based environment. In one embodiment, the registry includes an application program to permit users to browse, search and provision or purchase applications. The list of applications/content is accessed by users through one or more portals. In general, the portal provides access to the registry, including providing one or more views of the listing of applications/content.

Figure 2:
FIG. 2 illustrates an example screen display for an applications/content portal.
Figure 7:
FIG. 7 illustrates an example screen display for a computer-based user interface for the registry browser application.

FIG. 2 illustrates an example screen display for an applications/content portal. FIG. 2 depicts an example screen display to show some of the basic functions of a portal registry. FIGS. 6 and 7 illustrate example 10 feet and 2 feet user interfaces, respectively, for use with a browser application for the registry of the present invention. A browser application allows the user to browse the registry from a television and a computer through implementation of the 10 feet user interface (television) and the 2 feet user interface (computer). In general, a portal for the registry permits a user to search, browse, locate and deploy applications/content for a television-based environment. In one embodiment, to implement a search feature, a user enters one or more keywords related to the application. For the example shown in FIG. 2, a user enters the keywords "Television Games." In response, the registry lists all applications/contents that relate to "Television Games." The example portal of FIG. 2 also shows viewing applications/content based on "Latest Releases", "Most Popular Releases" and "Least Popular Releases." An example portal further permits users to submit reviews and to read reviews by others. In another embodiment, the user may search the list of applications/content by categories.

The registry permits users to launch applications. Through use of the home media system (FIG. 1), a user may launch an application from a television or launch an application from a personal computer. In one embodiment, the applications are remote applications. In general, a remote application is executed on a computer platform remote from the implementation of the user interface. For the registry, a remote application may be launched on any computer across the network for implementation on a media device at a household. To this end, the registry provides locations of the listed applications to execute the applications remote from the users' households. The applications of the registry may also be downloaded to households. Under this scenario, the registry provides a means for a user to download the application to a computer at the household.

FIG. 3 is a block diagram illustrating one embodiment for the registry system. One or more portals (310) are generated to access the registry. A portal may comprise an Internet Web Site. The user obtains access to the portal(s) 310 through either a private and public network. The user accesses the portal, via a computer, to search, browse, access and launch applications. In one embodiment, the registry system may support multiple portals. Each portal may be customized based on an underlying set of criteria. For example, the host of registry system may customize portals based on customer requirements. A business method for generating customized portals for customers is described more fully below in conjunction with a description of FIG. 5.

Database 146 stores information about the applications/content offered on the registry. For example, database 146 may store the title, description and entitlement model for each application. An example of information associated with applications on the registry in shown in FIG. 4. Application logic 320 processes information on applications/content for display and access by portals 310. Application logic 320 may comprise one or more rules that govern the presentation of applications/content on a portal. For example, a user may search for applications using a key word search engine. Application logic 320 determines how the results of the search are presented. For example, application logic 320 may present results on relevant applications/content based on pay for placement criteria. In a pay for placement search results system, the ranking of the search results is determined based on an amount the vendors pay the search portal to list the vendor. In another embodiment, a vendor may partner with one or more vendors to sell related products. This vendor, as a customer of the registry system host, may have the products of their partners presented on their portal. Applications logic 320 may apply any rule or criteria to determine presentation of the applications/content to a portal without deviating from the spirit or scope of the invention.

The host of the registry receives, form third party application/content providers, a description of the application/content. In general, the applications/content descriptions provide information about an application for storage in database 146. In one embodiment, the application/content descriptions identify: information regarding the application/content; network locations that point to portions of the application/content for downloading; and the entitlement model for the application/content, etc. The host of the registry provides the XML definitions. In one embodiment, the description comprises an eXtensible mark-up language ("XML") application/content description. As shown in FIG. 3, XML application/content descriptions 330 are input to XML parser 340. In general, XML parser 340 processes the XML application/content descriptions for entry of the application/content into the database 146.

FIG. 4 illustrates example information for a television-based applications/content registry. The example table of FIG. 4 shows, in the first column, a name for the application/content. The first row of the table contains information for the content "Skydiving Channel." As shown in the columns of FIG. 4, "Description", "Icons", "Categories", "Keywords", "Rating", "Author", "Entitlement Model", and "Payment" information is provided for each application. For example, the description information for the "Painting Program" includes "Artistic software permits applying electronic paints to canvas" as shown in the second column for the "Painting Program" application. Icons, displayed with use of the registry browser application, are stored as depicted in the third column, labeled "Browser Icons." The application icons, shown in the fourth column, are used when the application is downloaded and installed in the user interface (i.e., 2 feet and 10 feet user interfaces).

In one embodiment, the host of the registry defines "n" categories for browsing applications/content in the registry. The categories are used in the user interfaces as a means for users to browse applications/content. The categories may be arranged hierarchically, such that some categories are arranged in a parent-child relationship. For example, a parent category may be created for all applications, and one or more child categories may be created for types of applications. For the embodiment of FIG. 4, the third party application/content provider also submits one or more keywords associated with the application/content as shown in the table of FIG. 4. The registry utilizes the keywords to perform key word searches. If the user submits a query with one or more keywords that matches one of the keywords associated with the application/content, then that application/content is returned in response to the query.

In one embodiment, the information associated with applications/content includes rating of the application/content. For the example shown in FIG. 4, the ratings are based on a "star system" (i.e., the higher the number of stars associated with the application/content, the higher the rating). In one embodiment, the ratings are editorial ratings from area experts or customers of the registry host. As shown in FIG. 4, the information of the applications/contents further identifies the author (e.g., "J. Smith" is the author of the application "Big Eraser").

The information accompanying the applications/content further includes the entitlement model. An entitlement model defines the conditions of use of the applications/content for the user. For example, the entitlement model defines the cost of an application/content. It may also specify a period of use for the application/content (e.g, the application/content is valid for one week), or it may specify a number of times that a user may consume the application/content (e.g., the application/content is valid for a single viewing). In other embodiments, the entitlement model may specify terms for user subscription. The last column in the example table of FIG. 4, labeled payment, specifies one or more payment options for the user.

The type of information stored in the table of FIG. 4 is exemplary, and the registry of the present invention may include any information related to the applications/content without deviating from the spirit and scope of the invention.

In one embodiment, the host of the registry may permit other parties to create their own specialized application/content portals (e.g., third party portals). For this embodiment, the host of the registry applies application logic (FIG. 3) specific to the party's portal. For example, the third party portal company may desire to only offer applications/content of their business partners. For this embodiment, the registry host programs the application logic to filter the display of the business partners on the third party portal.

FIG. 5 illustrates an example search displayed at a third party portal. In one embodiment, a user may select categories. In response, the system displays all applications/content associated with the category. For this example, a user selects the category "Travel & Leisure." In response to this category, the host registry system, using the database 146, identifies all applications/content classified in the "Travel & Leisure." Table 526 of FIG. 5 lists example applications/content classified in the "Travel & Leisure" category. Specifically, the "Skydiving Channel", "Travel Channel", and "Greatest Sports Channel" are content classified in the Travel & Leisure category. The applications identified include "Pong Game", "Golf Game", "Home Shopping", and "Chess." A third party portal, entitled "Television Game Portal", provides television-based application games. For this example, the host registry applies application logic to present on the third party portal only application games. Thus, in response to the user's query, the host registry selects the "Chess", "Pong" and "Golf" games for display at the third party portal as shown in table 530 of FIG. 5. Any rules or application logic may be applied to the open registry to provide third party portals without deviating from the spirit or scope of the invention.

As discussed above, the user may browse the registry for applications/content. In one embodiment, the user may browse the registry from the television. The television based user interface, referred to as a 10-feet experience, presents screens suitable for viewing on a television. For example, the size of the font displayed on the television is large enough so that a user may view the characters on the television. In addition to the size of characters displayed on the television, user input is suitable for input by a remote control device. For example, the user does not enter substantial text using a media based remote control device.

FIG. 6 illustrates an example screen display for a television-based user interface for a registry browser. For this example, the screen display includes a number of selections to browse the registry. The user may browse the registry by "Categories", "Name", "Content Listings", and "Applications Listing." If the user highlights an item and presses a right arrow key on a remote control device, the browser application displays a list. For example, if the user highlights the "Categories" menu item and presses the right arrow key, then a list of categories for the applications/content is displayed. Similarly, for this example, the user may view lists of the applications/content by name, view all of the media content or view all of the applications. The screen display of FIG. 6 is merely exemplary of television based user interfaces, and any television based user interface may be implemented to browse the registry without deviating from the scope of the invention.

In one embodiment, the user may also browse the registry using a "2-feet" user interface experience. The 2 feet user interface is implemented on a computer (i.e., the user sits approximately 2 feet from the computer screen). In contrast with the 10 feet user interface experience, the computer-based user interface may display more information with smaller font. Using a computer-based user interface, the user has the ability to select small areas of the screen with a cursor control device (e.g., mouse). The user may also enter text using a keyboard.

FIG. 7 illustrates an example screen display for a computer-based user interface for the registry browser application. For this example, using a computer system keyboard, the user may type text in a dialog box to enter editorial comment about an application. FIG. 7 illustrates an example screen for a computer-based user interface; however, any computer-based user interface features may be implemented for the registry browser application.

The television-based applications, including the browser application, are deployed through a home media system. In one embodiment, the home media system uses a client-server mechanism to implement the user interface of an application on a television. The architecture of the remote application system comprises a three-tier system: the central server infrastructure, the home media system server and the home media system client. The home media system includes at least one server, a network, and at least one client. The client portion, referred to as a digital media adapter ("DMA") or digital media player ("DMP"), operates as a client to interface media devices to the system. For example, televisions 124, 126 and 128 may be coupled to a DMA to provide full functionality of services available on the home network to televisions 124, 126 and 128 (FIG. 1).

Figure 8:
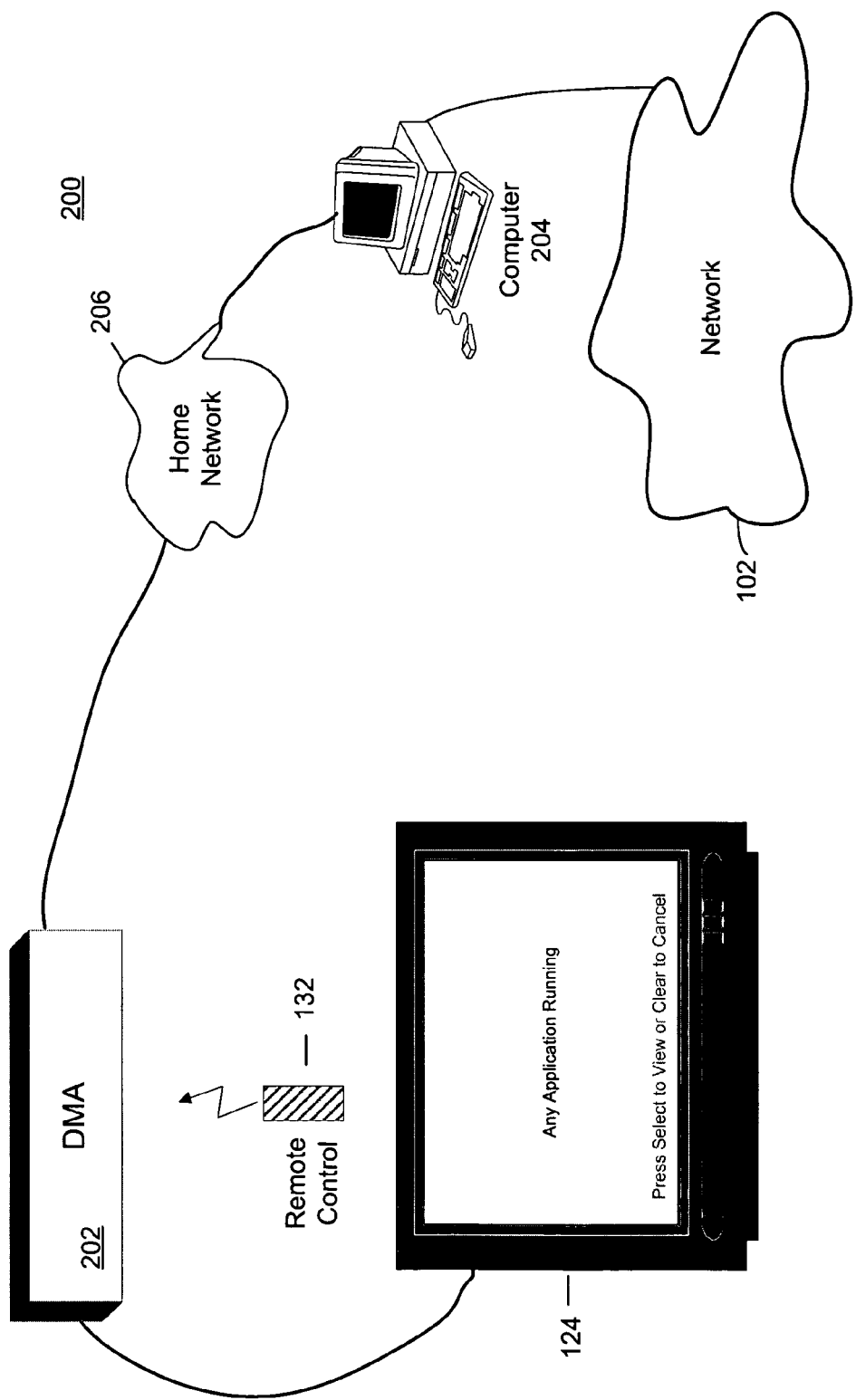
FIG. 8 illustrates one embodiment for a home media system.

FIG. 8 illustrates one embodiment for a home media system. A computer 204, digital media adapter ("DMA") 202 and home network 206 are shown in FIG. 8 as an example home media system 200. Home network 206 couples computer 204 to DMA 202. For example, home network 206 may comprise a network implemented in accordance with standards, such as Ethernet 10/100 on Category 5, HPNA, Home Plug, IEEE 802.11x, IEEE 1394, and USB 1.1/2.0. DMA 202 integrates television 124 into the home media system. Although the example home media system of FIG. 8 shows a DMA coupled to a television, the home media system may include multiple DMAs that operate as clients for multiple media devices (e.g., televisions, stereos, CD players, DVD players, etc.). Also, DMA 202 may be implemented directly onto television 124.

The server portion of the home media system may be implemented using a computer or a media server device. In one embodiment, an application program (e.g., registry browser application) is run on the home media system to implement a user interface on a television. For this implementation, the server remotes a user interface for the application to the client. The DMA client (202), interpreting the remote application, implements the user interface on television 124 (i.e., the DMA 202 renders UI screens on television 124 and interprets commands from the remote control 132). In one embodiment, the server (204) remotes the user interface of an application to the DMA client (202) via an open standard protocol (e.g., XRT).

The registry system may be implemented in either hardware or software, or a combination of hardware and software. For the software implementation, the registry system is software that includes a plurality of computer executable instructions for implementation on a general-purpose computer system. Prior to loading into a general-purpose computer system, the registry system software may reside as encoded information on a computer readable medium, such as a magnetic floppy disk, magnetic tape, and compact disc read only memory (CD-ROM). In one hardware implementation, the registry system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A system for providing one or more executable television-based applications on end user televisions via a portal that is viewable on the end user televisions, the system comprising:
a private data network connecting at least one registry server that contains at least one registry to said end user televisions, said registry comprising a listing of a plurality of executable applications that is interfaced via the portal provided by the system, the registry including a first executable application and a second, reusable executable third-party application, the first executable application for performing a different function than the second executable third-party application, the second executable third-party application comprising a function other than a program guide function and other than an updating function, the second executable third-party application further comprising a television-based, reusable user application;
a processor to execute the reusable user-application for providing to the user personal interaction functionality with the system via a portal that is viewable on the end user televisions, the registry comprising:
a description of the second executable third-party application, and
download information;
a network node to receive a user download request that is based on said download information, and to transport a requested executable third-party application through said private data network to a home media server based on said request, the home media server installing and executing the second executable third-party application as a reusable user application;
the home media server coupled to said private data network, said private data network being separate from a television broadcast network;
a digital media adapter coupled to the home media server, the digital media adapter being configured to receive user interface commands and process the received user interface commands, and to render a user interface on at least a first television constructed to receive signals from a television broadcast network based on said commands, and to implement a user interface rendering protocol to receive user interface commands,
said registry server being configured
for storing information about the second executable third-party application and
for hosting the portal on the data network that is different from the television broadcast network to allow viewing of said registry including information about the second executable third-party application;
said data network coupling said registry server and said home media server, the home media server for, upon a selection by the user:
receiving the second executable third-party application, and
installing the second executable third-party application as a reusable user application that is interfaced via the first television;
wherein, said registry server is configured for receiving a request from said home media server to view said information about the second executable third-party application, the home media server being further configured to:
send user interface commands to the digital media adapter, the user
interface commands being defined by the user interface rendering protocol, and
during presentation of the portal, and based on said commands, present a first user interface for the portal, the portal for:
receiving a user input via the first user interface;
based on the received user input, performing one or more of a search operation, a browse operation, and a provision operation for television-based applications; and
providing information used to execute the second executable third-party application; and
during execution of the second executable third-party application, and based on said commands, present to the first television a second user interface, the second user interface specific to the second executable third-party application.

2. The system as set forth in claim 1, wherein said at least one registry server further for hosting a plurality of customized portals, wherein each portal permits viewing of information on television-based applications selected based on one or more criteria.

3. The system as set forth in claim 1, wherein said information comprises a general description of one or more television-based applications.

4. The system as set forth in claim 1, wherein said information comprises a description of an entitlement model for said television-based application.

5. The system as set forth in claim 1, wherein said information comprises downloading information to permit a user to download the second executable application to said system.

6. The system as set forth in claim 1, further comprising a user interface for said portal, implemented on a television.

7. The system as set forth in claim 1, further comprising a user interface for said portal, implemented on a computer.

8. A tangible computer readable storage medium comprising a plurality of instructions, which when executed by a computer, causes the computer to provide information for at least one television-based application, said instructions for:
  establishing a connection via a private network connecting at least one registry server that contains at least one registry to an end subscribing user television upon receiving a request signal from a subscribing user;
  implementing a portal that is viewable on said at least one television that receives signals from a television broadcast network and providing access via said portal to said registry;
  storing in said registry a listing of a plurality of executable television-based applications including a first executable application and a second, reusable executable third-party application, the first executable application for performing a different function than the second executable third-party application, the second executable third-party application comprising a function other than a program guide function and other than an updating function, the second executable third-party application comprising a television-based user application for providing to the user, functionality for interactivity with a home media server by using the at least one television;
  storing in the registry a description of the second executable third-party application, and download information;
  providing, through said download information, instructions to download the second executable third-party application, install the second executable third-party application as a reusable user-application, and execute the second executable third-party application;
  storing information about the second executable third-party application;
  hosting at least one portal for viewing said registry including information about the second executable third-party application on said private data network, said private data network being separate from a television network;
  receiving, from said subscribing user, a request for downloading the second executable third-party application to said user's home media server;
  transporting a requested executable third-party application to the said user's home media server based on said request via said private data network connection, and receiving, in response to the request, the second executable third-party application;
  installing the second executable third-party application on said user's home media server;
  receiving, via the portal, a request, over the private data network, from the home media server to view said information about the second executable third-party application;
  instructing the home media server to:
    send user interface commands to a digital media adapter, the user
  interface commands being defined by a user interface rendering protocol,
  the digital media adapter coupled to the home media server,
    send commands instructing the digital media adapter to receive user interface commands and process the received user interface commands and to render a user interface on at least a television constructed to receive signals from a television broadcast network, and implement the user interface rendering protocol to receive user interface commands,
    implement, during presentation of the portal, the user interface commands to provide a first user interface for the portal, and through said portal,
    receive a user input via the first user interface;
    based on the received user input, perform one or more of a search operation, a browse operation, and a provision operation for television-based applications; and
    provide information used to execute the second executable
  third-party application; and
    during execution of the second executable third-party application, implement the user interface commands to provide to the television a second user interface, the second user interface specific to the second executable third-party application.

9. The computer readable medium as set forth in claim 8, further comprising hosting a plurality of customized portals, wherein each portal permits viewing of information on television-based applications selected based on one or more criteria.

10. The computer readable medium as set forth in claim 8, wherein said information comprises a general description of one or more television-based applications.

11. The computer readable medium as set forth in claim 8, wherein said information comprises a description of an entitlement model for said television-based applications.

12. The computer readable medium as set forth in claim 8, wherein said information comprises downloading information to permit a user to download the second executable third-party application to said home media server.

13. The computer readable medium as set forth in claim 8, wherein said home media server further comprises a user interface for said portal.

14. A method for providing information for at least one television-based executable application, said method comprising:
  establishing a connection via a private network connecting at least one registry server that contains at least one registry to an end subscribing user television upon receiving a request signal from a subscribing user;
  implementing a portal that is viewable on a television that receives television signals from a television broadcast network, and providing access via said portal to said registry;
  storing in said registry a listing of a plurality of executable applications including a first executable application and a second, reusable executable third-party application, the first executable application for performing a different function than the second executable third-party application, the second executable third-party application comprising a function other than a program guide function and other than an updating function, the second executable third-party application further comprising a television-based user-application, the user-application for providing, to users, a functionality for personal interaction with a home media server;

storing in the registry a description of the second executable third-party application, and download information;

providing, through said download information, instructions to download the second executable third-party application, install the second executable third-party application as a reusable user-application, and execute the second executable third-party application;

storing information about the second executable third-party application;

hosting at least one portal for viewing said information about the second executable application on said private data network, said private data network being separate from a television network;

receiving, via the at least one portal from said subscribing user, a request for the second executable third-party application to said user's home media server;

transport a requested executable third-party application to said user's home media server based on said request via said private data network connection;

installing the second executable third-party application on said user's home media server;

receiving, via the at least one portal over the data network, from the home media server, a request to view said information about the second executable third-party application;

instructing the home media server to:

send user interface commands to a digital media adapter, and implement a user interface rendering protocol to receive user interface commands, wherein the digital media adapter is coupled to the home media server, send commands instructing the digital media adapter to receive user interface commands and process the received user interface commands to render a user interface on at least a television constructed to receive signals from a television broadcast network, implement the user interface rendering protocol to receive user interface commands, implement, during presentation of the portal, the user interface commands to provide a first user interface for the portal, and through said portal, receive a user input via the first user interface, based on the received user input, perform one or more of a search operation, a browse operation, and a provision operation for television-based applications, and provide information used to execute the second executable third-party application, and during execution of the second executable third-party application, implement the user interface commands to provide to the television a second user interface, the second user interface specific to the second executable third-party application.

15. The system as set forth in claim 1, wherein the digital media adapter is coupled to the first television, and the second executable third-party application receives input from the digital media adapter.

16. The system as set forth in claim 1, wherein the first television comprises the digital media adapter, and the second executable third-party application receives input from the first television.

* * * * *